United States Patent
Fischbach et al.

(10) Patent No.: US 7,054,693 B2
(45) Date of Patent: May 30, 2006

(54) HIGH DATA RATE ACTUATOR/SENSOR CONTROL SYSTEM FOR A PLASTICS PROCESSING MACHINE

(75) Inventors: Gunther Fischbach, Fürstenfeldbruck (DE); Andreas Melkus, Oberndorf (AT)

(73) Assignee: Mannesmann Plastics Machinery GmbH, München (DE)

( * ) Notice: Subject to any disclaimer, the term of this patent is extended or adjusted under 35 U.S.C. 154(b) by 54 days.

(21) Appl. No.: 10/700,351

(22) Filed: Nov. 3, 2003

(65) Prior Publication Data
US 2004/0133285 A1    Jul. 8, 2004

(30) Foreign Application Priority Data
Nov. 2, 2002    (DE) .................... 102 50 972
Jan. 25, 2003   (DE) .................... 103 02 878

(51) Int. Cl.
*G05B 15/02*    (2006.01)
(52) U.S. Cl. ........................................ 700/9
(58) Field of Classification Search ............. 700/1, 700/4, 8–10, 19, 20
See application file for complete search history.

(56) References Cited

U.S. PATENT DOCUMENTS

| | | | | |
|---|---|---|---|---|
| 5,134,574 | A  * | 7/1992  | Beaverstock et al. | 702/84 |
| 5,341,496 | A  * | 8/1994  | Middledorp et al. | 714/2 |
| 5,901,058 | A    | 5/1999  | Steinman et al. | 700/1 |
| 5,941,966 | A  * | 8/1999  | Gotze et al. | 710/105 |
| 6,075,452 | A  * | 6/2000  | Tsuchihashi | 340/3.1 |
| 6,191,543 | B1   | 2/2001  | Lai et al. | 318/34 |
| 6,269,274 | B1 * | 7/2001  | Steinman et al. | 700/28 |
| 6,564,268 | B1 * | 5/2003  | Davis et al. | 710/11 |
| 6,654,645 | B1 * | 11/2003 | Bermann et al. | 700/4 |
| 6,675,236 | B1 * | 1/2004  | Moon et al. | 710/29 |
| 6,813,664 | B1 * | 11/2004 | Koellner et al. | 710/117 |
| 2002/0158598 | A1 | 10/2002 | Oka | 318/560 |
| 2003/0009608 | A1 * | 1/2003 | Moon et al. | 710/29 |
| 2003/0097521 | A1 * | 5/2003 | Pfandler et al. | 711/103 |
| 2004/0093879 | A1 * | 5/2004 | Street et al. | 62/151 |

FOREIGN PATENT DOCUMENTS

| | | |
|---|---|---|
| DE | 199 58 790 A1 | 6/2001 |
| DE | 202 04 360 U  | 6/2002 |
| EP | 0 916 466 A   | 5/1999 |
| EP | 0 917 034 A1  | 5/1999 |
| WO | WO 00/04429 * | 1/2000 |
| WO | WO 01/69333 A | 9/2001 |

* cited by examiner

Primary Examiner—Maria N. Von Buhr
(74) Attorney, Agent, or Firm—Henry M. Feiereisen

(57) ABSTRACT

A control system for a plastics processing machine with at least one central processing unit with a real-time operating system is described. The central processing unit is connected to a plurality of actuators and/or sensors via a bus system, with at least one actuator and/or sensor directed to a rapidly fluctuating variable with a high-resolution. The first central processing unit can be released of overly burdensome control and communication tasks by using a first pre-processing unit which performs signal pre-processing for several sensors and/or actuators and by using a second pre-processing unit, which relieves the central processing unit directly of the bus communication.

23 Claims, 2 Drawing Sheets

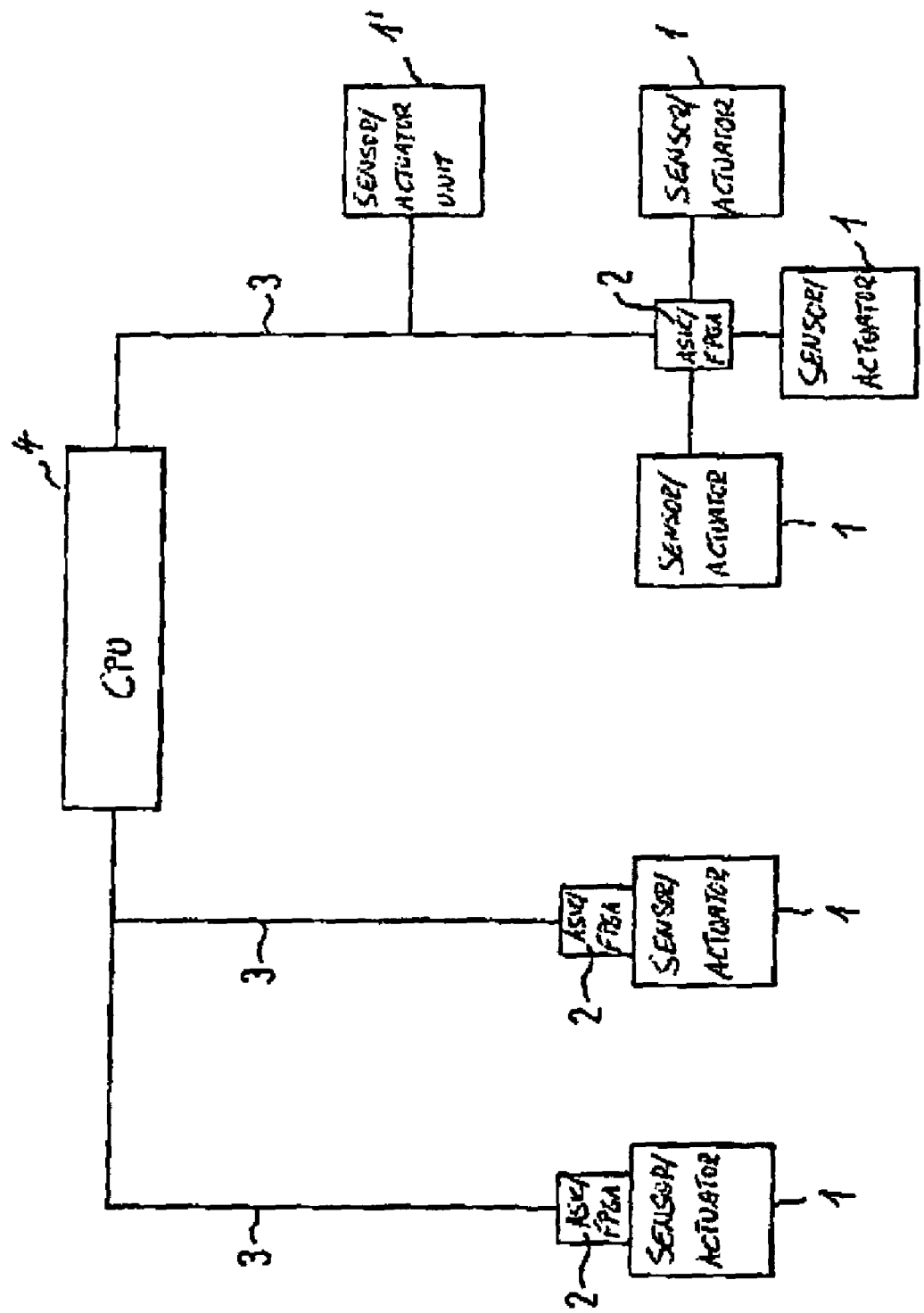

HIGH DATA RATE ACTUATOR/SENSOR CONTROL SYSTEM FOR A PLASTICS PROCESSING MACHINE

CROSS-REFERENCES TO RELATED APPLICATIONS

This application claims the priority of German Patent Applications, Serial Nos. 102 50 972.7, filed Nov. 2, 2002, and 103 02 878.1, filed Jan. 25, 2003, pursuant to 35 U.S.C. 119(a)–(d), the disclosure of which is incorporated herein by reference.

BACKGROUND OF THE INVENTION

The present invention relates to a control system for plastics processing machines and handling devices for such machines, and more particularly to a controller for plastics processing machines with a serial bus system and real-time processing requirements.

Control systems with digital peripheral equipment for plastics processing machines use bus systems, in particular serial bus systems, meeting real-time requirements for communicating between sensors and/or actuators and the central processor (CPU), hereinafter also referred to as central processing unit. Intensive competition has rapidly lowered the cost-efficiency ratio of CPU units. Conversely, the capabilities of real-time-capable, serial bus systems have progressed at a much slower pace. In addition, in particular when digital sensors or actuators are used, complex protocols have to be processed for calibration, identification of the manufacturer or adaptation of drivers from different manufacturers. The increased complexity of these programs require a greater bandwidth of the bus systems and more CPU resources, wherein system functions in a separate CPU/RAM configuration are economically difficult to implement in small quantities.

German patent publication DE 199 58 790 C2 describes a machine for producing parts made of plastic or rubber, whereby a control device is subdivided into at least a first and a second functional unit. The first functional unit measures an actual temperature value, whereas the second functional unit performs control functions and outputs the control signals. DE 199 58 790 C2 addresses the problem of providing a decentralized input/output system that does not require additional installation space and manufacturing expenses. In addition, the wiring complexity should be minimized to save cost. This problem is solved by implementing in particular a portion of the functional unit with a control device in a plug connector which is connected via a field bus, e.g. a CAN-bus, with the actual central controller. The electronics contained in the plug connector can include, for example, an ASIC (application-specific integrated circuit), a microprocessor and a power supply. The ASIC converts the analog measurement values to digital signals. The microprocessor controlled the ASIC and performs the computation, linearization, cold-junction-compensation and transmission to the field bus controller.

In addition to using thermocouples as sensors, DE 199 58 790 C2 describes the possibility of providing in a controller additional digital outputs which can be connected with other sensors, for example core pullers, limits switches or proximity switches.

The sensors or actuators (e.g., heating tapes) mentioned in DE 199 58 790 C2 all represent components which operate relatively slowly and typically do not require a high resolution.

The problem addressed by the present invention, on the other hand, relates to the large burden placed on the central processors by the bus communication, in particular with rapidly changing variables (e.g., rapidly changing mechanical variables) with a high resolution. When using such sensors and actuators, it may happen that significant resources of the CPU are used (up to 40%) by the bus communication, including other tasks like signal pre-processing, driver adaptation, calibration, etc. These resources are then not available to the central processor or processing unit for actual computational and control tasks.

European Pat. No. EP 0 917 034 describes a method for remote monitoring and/or remote maintenance of an injection molding machine. The injection molding machine is provided with an SPS with at least one CPU for controlling the actuators of the injection molding machine in real-time. Data are transmitted between the injection molding machine and a remote monitoring station located at a distal location for remote monitoring and/or remote maintenance. As described in EP 0 917 034, several actuators and sensors are connected via inputs and outputs to a real-time controller. The inputs and outputs can include a digital card or an analog card. However, EP 0 917 034 does not disclose that these cards are provided with pre-processing units. Accordingly, the inputs and outputs represent conventional interfaces which for high data transmission rates require an increased communication bandwidth over a real-time-capable bus systems.

U.S. Pat. No. 5,901,058 describes a system and a method for achieving heterogeneous data flow in control systems. A server is connected with a plurality of controllers via a bus system, with the controllers operatively connected via a bus system with individual input/outputs stations which provide communication with sensors and actuators. However, this reference does not suggest a direct connection of a plurality of actuators to an input/output as well as the use of ASICs or FPGAs (field-programmable gate arrays) in the input/output devices for decreasing the bandwidth requirements.

It would therefore be desirable and advantageous to provide an improved device for reducing the communication bandwidth requirements of real-time-capable bus systems, in particular serial bus systems, of plastics processing machines and associated handling devices, which obviates prior art shortcomings and is able to specifically free up computing capacity in the CPU.

SUMMARY OF THE INVENTION

According to one aspect of the invention, a control system for a plastics processing machine includes a central processing unit executing a real-time operating system, a plurality of actuators and/or sensors connected via a bus system to the central processing unit, with at least one actuator and/or at least one sensor being directed to a rapidly fluctuating variable with a high resolution, and at least one first pre-processing unit having at least one ASIC or FPGA, wherein the plurality of actuator and/or sensor, of which at least one is directed to a rapidly fluctuating variable with a high resolution, is connected with the first pre-processing unit, and wherein the first pre-processing unit is connected with the central processing unit via the bus system.

According to another aspect of the invention, a control system for a plastics processing machine includes a central processing unit executing a real-time operating system, a plurality of actuators and/or sensors connected via a bus system to the central processing unit, with at least one actuator and/or at least one sensor being directed to a rapidly fluctuating variable with a high resolution, and at least one pre-processing unit having at least one ASIC or FPGA arranged between the bus system and the central processing unit.

According to yet another aspect of the invention, a control system for a plastics processing machine includes a central processing unit executing a real-time operating system, a plurality of actuators and/or sensors connected via a bus system to the central processing unit, with at least one actuator and/or at least one sensor being directed to a rapidly fluctuating variable with a high resolution, at least one first pre-processing unit having at least one ASIC or FPGA, and a second pre-processing unit with at least one ASIC or FPGA arranged between the bus system and the central processing unit, wherein the plurality of actuators and/or sensors, of which one is directed to a rapidly fluctuating variable with a high resolution, is connected with the first pre-processing unit, and wherein the first pre-processing unit is connected with the central processing unit via the bus system.

In a control system according to the invention, the data of several sensors and/or actuators are pre-processed with the help of field-programmable gate arrays (FPGA) and/or application-specific integrated circuits (ASIC). At least one sensor or actuator represents a component that is directed to a rapidly fluctuating, in particular mechanical, variable with a high resolution. Synchronization and processing is economically feasible only by using FPGAs and ASICs. A quantity-dependent, economical balance between local processing capacity and the demand on communication resources is achieved via the quantity-dependent implementation of FPGAs and ASICs in signal pre-processing, system functions and communication tasks. The use of FPGAs and ASICs according to the invention for pre-processing significantly lessens the burden on the bus communication in fully and substantially digital machine controls and promotes the economical application of a single CPU for real-time applications. Shielding the communication from local tasks thereby prevents the formation of bottlenecks in the real-time bus communication. A complex control can then be implemented with a pre-defined bandwidth of the bus systems, in particular of the serial bus systems.

Embodiments of the invention may include one or more of the following features. Another processing unit with a CPU can be arranged between the bus system and the first pre-processing unit. An I/O system can be arranged on the bus system or on the other processing unit connected downstream of the bus system. The pre-processing unit can be adapted to preprocess signals and match drivers for the sensors and/or the actuators, and to calibrate the sensors and/or the actuators. The bus system may be implemented as a serial bus. The central processing unit can include an input device (keyboard) and a monitor.

Compared to German patent publication DE 199 58 790 C2, it is much more expensive to process a 16-bit or 21-bit encoded pressure or distance signal at a millisecond clock rate than to query a digital input for a core switch or limit switch. Such mechanical variables typically change 100 times faster than the temperature variables.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a schematic diagram of a control system for a plastics processing machine according to the invention.

DETAILED DESCRIPTION OF PREFERRED EMBODIMENTS

Figure 3:
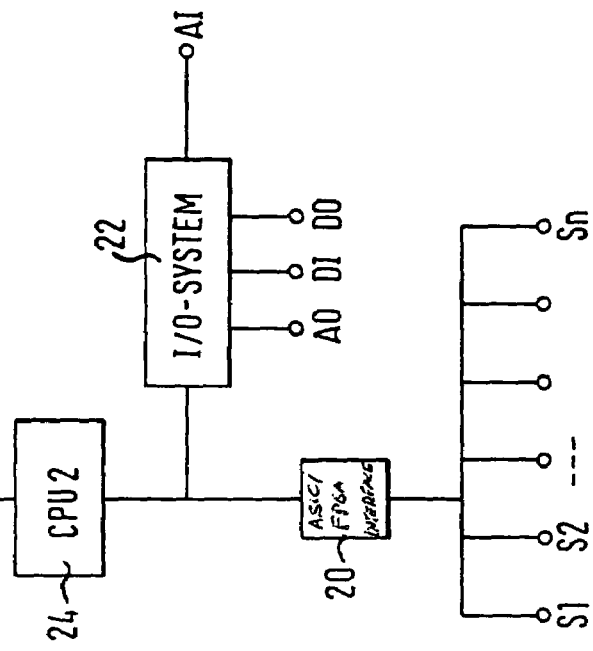
FIG. 3 is a schematic diagram of a third control system for a plastics processing machine according to the invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a CPU 4 which, as described in more detail below, is connected via a serial bus system 3 to an ASIC/FPGA unit 2. The ASIC/FPGA unit 2 includes a field-programmable gate array (FPGA) and/or an application-specific integrated circuit (ASIC), which is specifically tailored to the present embodiment and the connected sensors or actuators. The ASIC/FPGA unit 2 is connected with at least one sensor and/or actuator 1 and preprocesses the signals received from the sensor and/or actuator 1. At least one sensor or actuator is implemented as a component which can measure a rapidly fluctuating variable with high resolution. The resolution can be, for example in the range of 16, 21 or more bits. These quantities are typically mechanical quantities, such as pressure, linear dimensions, total mass flow or similar quantities. However, some sensors—for example, the sensor unit or actuator unit 1' in FIG. 1—can be directly connected with the serial bus system 3. Suitable are here particular those components which require only insignificant bandwidth resources from the serial bus system and whose data cannot be or need not be locally processed. Such sensors or actuators can be directly connected with the CPU 4 via the serial bus system.

Figure 2:
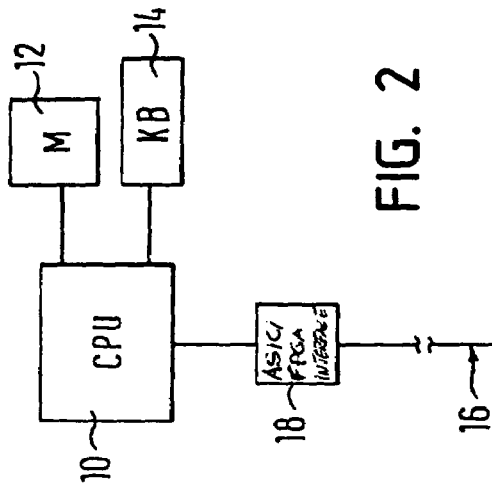
FIG. 2 is a schematic diagram of another control system for a plastics processing machine according to the invention.

FIG. 2 shows another embodiment of the control system according to the invention. A CPU unit 10 is provided which is connected to a monitor 12 and a keyboard 14 for input and output of data. The CPU unit 10 is coupled to a pre-processing unit 18, subsequently referred to as second pre-processing unit, which directly relieves the CPU unit 10 of the bus communication. By using the second pre-processing unit 18, the wait cycles which have to be maintained for a bus response, do not adversely affect the available CPU capacity. The second pre-processing unit 18 also includes an ASIC or a FPGA suitably adapted for communication.

The second pre-processing unit 18 is in this case connected, on one hand, via a serial bus system 16 with a first pre-processing unit 20 and, on the other hand, with an I/O system 22. Several sensors or actuators are connected to the first pre-processing unit 20 which again includes an ASIC and/or a FPGA. In the present example, n components S1 to Sn are depicted which are directly connected with the first pre-processing unit 20. These components can be sensors and/or actuators. It should be emphasized, that several sensors or actuators S1 to Sn are always connected to the first pre-processing unit 20, whereby at least one sensor or actuator is directed to a rapidly fluctuating mechanical quantity, such as a pressure signal, a distance signal, a volume flow signal, etc., with a high resolution. In particular, such rapidly fluctuating variables with a high resolution require a high bus communication speed, which would tax the capacity of the central processing unit, unless a corresponding pre-processing unit is connected upstream.

It will be understood that several pre-processing units 20 can be connected to the serial bus system 16. Only one pre-processing unit is depicted in FIG. 2. In addition, an input/output system (I/O system) 22 with analog inputs and outputs (AI, AO) and digital inputs and outputs (DI, DO) can be provided.

The additional embodiment depicted in FIG. 3 differs from the embodiment depicted in FIG. 2 with respect to two details. Instead of the second pre-processing unit 18, a second CPU unit 24 (CPU 2) is provided downstream of the bus system 16', which is implemented as a SCSI bus. The first CPU unit (CPU 1) with the reference numeral 10' is connected with the second CPU unit 24 directly via the serial bus 16'. This "2-CPU controller" reduces the bus communication in particular through the use of the second CPU unit 24, which transmits to the first CPU unit 10' and receives from the first CPU unit 10' via the serial bus 16' only the signals required for the actual control.

The control and communication with the sensors and/or actuators S1 to Sn is again performed in the first pre-processing unit 20, so that the communication between the first pre-processing unit 20 and the second CPU unit 24 can be kept at a minimum. In this embodiment, too, at least one of the sensors or actuators is directed to a rapidly fluctuating variable with high resolution.

By pre-processing the signals and/or data according to the invention with the ASIC/FPGA unit, a feedback to the sensor/actuator can be implemented without overly taxing the resources of the serial bus system for control commands or data transmission. Real-time requirements of the control system can then be more easily satisfied, in particular when the time-critical signal processing and data computations are performed by the ASICs/FPGAs, which can provide feedback to the sensors/actuators.

In addition, complex control systems where several signals and data have to be considered, can be implemented with serial bus systems having a predetermined bandwidth.

What is claimed as new and desired to be protected by Letters Patent is set forth in the appended claims and includes equivalents of the elements recited therein:

What is claimed is:

1. A control system for a plastics processing machine, comprising:
    a central processing unit executing a real-time operating system,
    a plurality of actuators and/or sensors connected via a bus system to the central processing unit, with at least one actuator and/or at least one sensor being directed to a rapidly fluctuating variable with a high resolution, and
    at least one first pre-processing unit having at least one ASIC or FPGA,
    wherein the plurality of actuators and/or sensors, of which at least one is directed to a rapidly fluctuating variable with a high resolution, is connected with the first pre-processing unit, and
    wherein the first pre-processing unit is connected with the central processing unit via the bus system.

2. The control system of claim 1, and further comprising a second processing unit having a CPU and disposed between the bus system and the first pre-processing unit.

3. The control system of claim 1, and further comprising an I/O system directly disposed on the bus system.

4. The control system of claim 2, and further comprising an I/O system disposed on the second processing unit connected downstream of the bus system.

5. The control system of claim 1, wherein the at least one first pre-processing unit is adapted to preprocess signals and match drivers for the sensors and/or the actuators, and to calibrate the sensors and/or the actuators.

6. The control system of claim 1, wherein the bus system is implemented as a serial bus.

7. The control system of claim 1, wherein the central processing unit includes an input device and a monitor.

8. The control system of claim 7, wherein the input device is a keyboard.

9. The control system of claim 1, wherein the at least one first pre-processing unit is configured to relieve the central processing unit from communicating via the bus.

10. The control system of claim 2, wherein the second pre-processing unit is configured to relieve the central processing unit from communicating via the bus.

11. A control system for a plastics processing machine, comprising:
    a central processing unit executing a real-time operating system,
    a plurality of actuators and/or sensors connected via a bus system to the central processing unit, with at least one actuator and/or at least one sensor being directed to a rapidly changing variable with a high resolution, and
    at least one pre-processing unit having at least one ASIC or FPGA arranged between the bus system and the central processing unit.

12. The control system of claim 11, wherein the bus system is implemented as a serial bus.

13. The control system of claim 11, wherein the central processing unit includes an input device and a monitor.

14. The control system of claim 13, wherein the input device is a keyboard.

15. The control system of claim 11, wherein the pre-processing unit and/or the other pre-processing unit are configured to relieve the central processing unit from communicating via the bus.

16. A control system for a plastics processing machine, comprising:
    a central processing unit executing a real-time operating system,
    a plurality of actuators and/or sensors connected via a bus system to the central processing unit, with at least one actuator and/or at least one sensor being directed to a rapidly fluctuating variable with a high resolution,
    at least one first pre-processing unit having at least one ASIC or FPGA and connected with the central processing unit via the bus system; and
    a second pre-processing unit having at least one ASIC or FPGA and disposed between the bus system and the central processing unit,
    wherein the plurality of actuators and/or sensors, of which at least one is directed to the rapidly fluctuating variable with high resolution, is connected with the first pre-processing unit.

17. A control system for a plastics processing machine, comprising:
    a central processing unit executing a real-time operating system;
    a first operating element responsive to a fluctuating variable with a high resolution and operatively connected to the central processing unit via a bus system; and a first pre-processing unit having at least one ASIC or FPGA and disposed in the bus system between the central processing unit and the first operating element for locally processing the first operating element.

18. The control system of claim 17, wherein the operating element is a member selected from the group consisting of actuator and sensor.

19. The control system of claim 17, and further comprising a second said operating element connected to the bus system.

20. The control system of claim 17, and further comprising a second said pre-processing unit disposed on the bus system between the central processing unit and the first pre-processing unit.

21. The control system of claim 17, and further comprising an I/O system directly disposed on the bus system.

22. The control system of claim 17, and further comprising a further central processing unit operatively connected to the first central processing unit via a second bus system, and an I/O system disposed on the second bus pre-processing unit connected downstream of the bus system.

23. The control system of claim 17, wherein the bus system is implemented as a serial bus.

* * * * *

UNITED STATES PATENT AND TRADEMARK OFFICE
CERTIFICATE OF CORRECTION

| | | |
|---|---|---|
| PATENT NO. | : 7,054,693 B2 | Page 1 of 5 |
| APPLICATION NO. | : 10/700351 | |
| DATED | : May 30, 2006 | |
| INVENTOR(S) | : Fischbach et al. | |

It is certified that error appears in the above-identified patent and that said Letters Patent is hereby corrected as shown below:

Please delete column 1 line 1 through column 8 line 11 and insert column 1 line 1 through column 8 line 10 as attached.

Signed and Sealed this

First Day of April, 2008

JON W. DUDAS
*Director of the United States Patent and Trademark Office*

HIGH DATA RATE ACTUATOR/SENSOR CONTROL SYSTEM FOR A PLASTICS PROCESSING MACHINE

CROSS-REFERENCES TO RELATED APPLICATIONS

This application claims the priority of German Patent Applications, Serial Nos. 102 50 972.7, filed Nov. 2, 2002, and 103 02 878.1, filed Jan. 25, 2003, pursuant to 35 U.S.C. 119(a)–(d), the disclosure of which is incorporated herein by reference.

BACKGROUND OF THE INVENTION

The present invention relates to a control system for plastics processing machines and handling devices for such machines, and more particularly to a controller for plastics processing machines with a serial bus system and real-time processing requirements.

Control systems with digital peripheral equipment for plastics processing machines use bus systems, in particular serial bus systems, meeting real-time requirements for communicating between sensors and/or actuators and the central processor (CPU), hereinafter also referred to as central processing unit. Intensive competition has rapidly lowered the cost-efficiency ratio of CPU units. Conversely, the capabilities of real-time-capable, serial bus systems have progressed at a much slower pace. In addition, in particular when digital sensors or actuators are used, complex protocols have to be processed for calibration, identification of the manufacturer or adaptation of drivers from different manufacturers. The increased complexity of these programs require a greater bandwidth of the bus systems and more CPU resources, wherein system functions in a separate CPU/RAM configuration are economically difficult to implement in small quantities.

German patent publication DE 199 58 790 C2 describes a machine for producing parts made of plastic or rubber, whereby a control device is subdivided into at least a first and a second functional unit. The first functional unit measures an actual temperature value, whereas the second functional unit performs control functions and outputs the control signals. DE 199 58 790 C2 addresses the problem of providing a decentralized input/output system that does not require additional installation space and manufacturing expenses. In addition, the wiring complexity should be minimized to save cost. This problem is solved by implementing in particular a portion of the functional unit with a control device in a plug connector which is connected via a field bus, e.g. a CAN-bus, with the actual central controller. The electronics contained in the plug connector can include, for example, an ASIC (application-specific integrated circuit), a microprocessor and a power supply. The ASIC converts the analog measurement values to digital signals. The microprocessor controlled the ASIC and performs the computation, linearization, cold-junction-compensation and transmission to the field bus controller.

In addition to using thermocouples as sensors, DE 199 58 790 C2 describes the possibility of providing in a controller additional digital outputs which can be connected with other sensors, for example core pullers, limits switches or proximity switches.

The sensors or actuators (e.g., heating tapes) mentioned in DE 199 58 790 C2 all represent components which operate relatively slowly and typically do not require a high resolution.

The problem addressed by the present invention, on the other hand, relates to the large burden placed on the central processors by the bus communication, in particular with rapidly changing variables (e.g., rapidly changing mechanical variables) with a high resolution. When using such sensors and actuators, it may happen that significant resources of the CPU are used (up to 40%) by the bus communication, including other tasks like signal pre-processing, driver adaptation, calibration, etc. These resources are then not available to the central processor or processing unit for actual computational and control tasks.

European Pat. No. EP 0 917 034 describes a method for remote monitoring and/or remote maintenance of an injection molding machine. The injection molding machine is provided with an SPS with at least one CPU for controlling the actuators of the injection molding machine in real-time. Data are transmitted between the injection molding machine and a remote monitoring station located at a distal location for remote monitoring and/or remote maintenance. As described in EP 0 917 034, several actuators and sensors are connected via inputs and outputs to a real-time controller. The inputs and outputs can include a digital card or an analog card. However, EP 0 917 034 does not disclose that these cards are provided with pre-processing units. Accordingly, the inputs and outputs represent conventional interfaces which for high data transmission rates require an increased communication bandwidth over a real-time-capable bus systems.

U.S. Pat. No. 5,901,058 describes a system and a method for achieving heterogeneous data flow in control systems. A server is connected with a plurality of controllers via a bus system, with the controllers operatively connected via a bus system with individual input/outputs stations which provide communication with sensors and actuators. However, this reference does not suggest a direct connection of a plurality of actuators to an input/output as well as the use of ASICs or FPGAs (field-programmable gate arrays) in the input/output devices for decreasing the bandwidth requirements.

It would therefore be desirable and advantageous to provide an improved device for reducing the communication bandwidth requirements of real-time-capable bus systems, in particular serial bus systems, of plastics processing machines and associated handling devices, which obviates prior art shortcomings and is able to specifically free up computing capacity in the CPU.

SUMMARY OF THE INVENTION

According to one aspect of the invention, a control system for a plastics processing machine includes a central processing unit executing a real-time operating system, a plurality of actuators and/or sensors connected via a bus system to the central processing unit, with at least one actuator and/or at least one sensor being directed to a rapidly fluctuating variable with a high resolution, and at least one first pre-processing unit having at least one ASIC or FPGA, wherein the plurality of actuator and/or sensor, of which at least one is directed to a rapidly fluctuating variable with a high resolution, is connected with the first pre-processing unit, and wherein the first pre-processing unit is connected with the central processing unit via the bus system.

According to another aspect of the invention, a control system for a plastics processing machine includes a central processing unit executing a real-time operating system, a plurality of actuators and/or sensors connected via a bus system to the central processing unit, with at least one actuator and/or at least one sensor being directed to a rapidly fluctuating variable with a high resolution, and at least one pre-processing unit having at least one ASIC or FPGA arranged between the bus system and the central processing unit.

According to yet another aspect of the invention, a control system for a plastics processing machine includes a central processing unit executing a real-time operating system, a plurality of actuators and/or sensors connected via a bus system to the central processing unit, with at least one actuator and/or at least one sensor being directed to a rapidly fluctuating variable with a high resolution, at least one first pre-processing unit having at least one ASIC or FPGA, and a second pre-processing unit with at least one ASIC or FPGA arranged between the bus system and the central processing unit, wherein the plurality of actuators and/or sensors, of which one is directed to a rapidly fluctuating variable with a high resolution, is connected with the first pre-processing unit, and wherein the first pre-processing unit is connected with the central processing unit via the bus system.

In a control system according to the invention, the data of several sensors and/or actuators are pre-processed with the help of field-programmable gate arrays (FPGA) and/or application-specific integrated circuits (ASIC). At least one sensor or actuator represents a component that is directed to a rapidly fluctuating, in particular mechanical, variable with a high resolution. Synchronization and processing is economically feasible only by using FPGAs and ASICs. A quantity-dependent, economical balance between local processing capacity and the demand on communication resources is achieved via the quantity-dependent implementation of FPGAs and ASICs in signal pre-processing, system functions and communication tasks. The use of FPGAs and ASICs according to the invention for pre-processing significantly lessens the burden on the bus communication in fully and substantially digital machine controls and promotes the economical application of a single CPU for real-time applications. Shielding the communication from local tasks thereby prevents the formation of bottlenecks in the real-time bus communication. A complex control can then be implemented with a pre-defined bandwidth of the bus systems, in particular of the serial bus systems.

Embodiments of the invention may include one or more of the following features. Another processing unit with a CPU can be arranged between the bus system and the first pre-processing unit. An I/O system can be arranged on the bus system or on the other processing unit connected downstream of the bus system. The pre-processing unit can be adapted to preprocess signals and match drivers for the sensors and/or the actuators, and to calibrate the sensors and/or the actuators. The bus system may be implemented as a serial bus. The central processing unit can include an input device (keyboard) and a monitor.

Compared to German patent publication DE 199 58 790 C2, it is much more expensive to process a 16-bit or 21-bit encoded pressure or distance signal at a millisecond clock rate than to query a digital input for a core switch or limit switch. Such mechanical variables typically change 100 times faster than the temperature variables.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a schematic diagram of a control system for a plastics processing machine according to the invention;

FIG. 2 is a schematic diagram of another control system for a plastics processing machine according to the invention; and FIG. 3 is a schematic diagram of a third control system for a plastics processing machine according to the invention.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a CPU 4 which, as described in more detail below, is connected via a serial bus system 3 to an ASIC/FPGA unit 2. The ASIC/FPGA unit 2 includes a field-programmable gate array (FPGA) and/or an application-specific integrated circuit (ASIC), which is specifically tailored to the present embodiment and the connected sensors or actuators. The ASIC/FPGA unit 2 is connected with at least one sensor and/or actuator 1 and preprocesses the signals received from the sensor and/or actuator 1. At least one sensor or actuator is implemented as a component which can measure a rapidly fluctuating variable with high resolution. The resolution can be, for example in the range of 16, 21 or more bits. These quantities are typically mechanical quantities, such as pressure, linear dimensions, total mass flow or similar quantities. However, some sensors—for example, the sensor unit or actuator unit 1' in FIG. 1—can be directly connected with the serial bus system 3. Suitable are here particular those components which require only insignificant bandwidth resources from the serial bus system and whose data cannot be or need not be locally processed. Such sensors or actuators can be directly connected with the CPU 4 via the serial bus system.

FIG. 2 shows another embodiment of the control system according to the invention. A CPU unit 10 is provided which is connected to a monitor 12 and a keyboard 14 for input and output of data. The CPU unit 10 is coupled to a pre-processing unit 18, subsequently referred to as second pre-processing unit, which directly relieves the CPU unit 10 of the bus communication. By using the second pre-processing unit 18, the wait cycles which have to be maintained for a bus response, do not adversely affect the available CPU capacity. The second pre-processing unit 18 also includes an ASIC or a FPGA suitably adapted for communication.

The second pre-processing unit 18 is in this case connected, on one hand, via a serial bus system 16 with a first pre-processing unit 20 and, on the other hand, with an I/O system 22. Several sensors or actuators are connected to the first pre-processing unit 20 which again includes an ASIC and/or a FPGA. In the present example, n components S1 to Sn are depicted which are directly connected with the first pre-processing unit 20. These components can be sensors and/or actuators. It should be emphasized, that several sensors or actuators S1 to Sn are always connected to the first pre-processing unit 20, whereby at least one sensor or actuator is directed to a rapidly fluctuating mechanical quantity, such as a pressure signal, a distance signal, a volume flow signal, etc., with a high resolution. In particular, such rapidly fluctuating variables with a high resolution require a high bus communication speed, which would tax the capacity of the central processing unit, unless a corresponding pre-processing unit is connected upstream.

It will be understood that several pre-processing units 20 can be connected to the serial bus system 16. Only one pre-processing unit is depicted in FIG. 2. In addition, an input/output system (I/O system) 22 with analog inputs and outputs (AI, AO) and digital inputs and outputs (DI, DO) can be provided.

The additional embodiment depicted in FIG. 3 differs from the embodiment depicted in FIG. 2 with respect to two details. Instead of the second pre-processing unit 18, a second CPU unit 24 (CPU 2) is provided downstream of the bus system 16', which is implemented as a SCSI bus. The first CPU unit (CPU 1) with the reference numeral 10' is connected with the second CPU unit 24 directly via the serial bus 16'. This "2-CPU controller" reduces the bus communication in particular through the use of the second CPU unit 24, which transmits to the first CPU unit 10' and receives from the first CPU unit 10' via the serial bus 16' only the signals required for the actual control.

The control and communication with the sensors and/or actuators S1 to Sn is again performed in the first pre-processing unit 20, so that the communication between the first pre-processing unit 20 and the second CPU unit 24 can be kept at a minimum. In this embodiment, too, at least one of the sensors or actuators is directed to a rapidly fluctuating variable with high resolution.

By pre-processing the signals and/or data according to the invention with the ASIC/FPGA unit, a feedback to the sensor/actuator can be implemented without overly taxing the resources of the serial bus system for control commands or data transmission. Real-time requirements of the control system can then be more easily satisfied, in particular when the time-critical signal processing and data computations are performed by the ASICs/FPGAs, which can provide feedback to the sensors/actuators.

In addition, complex control systems where several signals and data have to be considered, can be implemented with serial bus systems having a predetermined bandwidth.

What is claimed as new and desired to be protected by Letters Patent is set forth in the appended claims and includes equivalents of the elements recited therein:

What is claimed is:

1. A control system for a plastics processing machine, comprising:
   a central processing unit adapted to execute a real-time operating system;
   a plurality of actuators and/or sensors connected via a bus system to the central processing unit, at least one actuator and/or at least one sensor being directed to a rapidly fluctuating variable with a high resolution; and
   at least one first pre-processing unit having at least one ASIC or FPGA, at least one actuator and/or sensor directed to a rapidly fluctuating variable with a high resolution being connected with the first pre-processing unit, the first pre-processing unit being connected with the central processing unit via the bus system.

2. The control system of claim 1, and further comprising a second processing unit having a CPU and disposed between the bus system and the first pre-processing unit.

3. The control system of claim 1, and further comprising an I/O system directly disposed on the bus system.

4. The control system of claim 2, further comprising an I/O system disposed on the bus system downstream of the second processing unit.

5. The control system of claim 1, wherein the at least one first pre-processing unit is adapted to preprocess signals and match drivers for the sensors and/or the actuators, and to calibrate the sensors and/or the actuators.

6. The control system of claim 1, wherein the bus system is implemented as a serial bus.

7. The control system of claim 1, wherein the central processing unit includes an input device and a monitor.

8. The control system of claim 7, wherein the input device is a keyboard.

9. The control system of claim 1, wherein at least one pre-processing unit is configured to relieve the central processing unit from communicating via the bus.

10. The control system of claim 2, wherein the second pre-processing unit is configured to relieve the central processing unit from communicating via the bus.

11. A control system for a plastics processing machine, comprising:
    a central processing unit adapted to execute a real-time operating system;
    a plurality of actuators and/or sensors connected via a bus system to the central processing unit, at least one actuator and/or at least one sensor being directed to a rapidly fluctuating variable with a high resolution; and
    at least one pre-processing unit having at least one ASIC or FPGA arranged between the bus system and the central processing unit.

12. The control system of claim 11, wherein the bus system is implemented as a serial bus.

13. The control system of claim 11, wherein the central processing unit includes an input device and a monitor.

14. The control system of claim 13, wherein the input device is a keyboard.

15. The control system of claim 11, wherein the pre-processing unit and/or another pre-processing unit are configured to relieve the central processing unit from communicating via the bus.

16. A control system for a plastics processing machine, comprising:
    a central processing unit adapted to execute a real-time operating system;
    a plurality of actuators and/or sensors connected via a bus system to the central processing unit, at least one actuator and/or at least one sensor being directed to a rapidly fluctuating variable with a high resolution;
    at least one first pre-processing unit having at least one ASIC or FPGA and connected with the central processing unit via the bus system; and
    a second pre-processing unit having at least one ASIC or FPGA and disposed between the bus system and the central processing unit, at least one actuator and/or sensor directed to the rapidly fluctuating variable with high resolution being connected with the first pre-processing unit, the first pre-processing unit being connected with the first pre-processing unit.

17. A control system for a plastics processing machine, comprising:
    a central processing unit adapted to execute a real-time operating system;
    a first operating element responsive to a fluctuating variable with a high resolution and operatively connected to the central processing unit via a bus system; and
    a first pre-processing unit having at least one ASIC or FPGA and connected to the bus system between the central processing unit and the first operating element for locally processing the first operating element.

18. The control system of claim 17, wherein the operating element is a member selected from the group consisting of actuator and sensor.

19. The control system of claim 17, and further comprising a second said operating element connected to the bus system.

20. The control system of claim 17, and further comprising a second said pre-processing unit disposed on the bus system between the central processing unit and the first pre-processing unit.

21. The control system of claim 17, and further comprising an I/O system directly disposed on the bus system.

22. The control system of claim 17, further comprising a further central processing unit operatively connected to the central processing unit via a second bus system, and an I/O system disposed on a bus system downstream of the further processing unit.

23. The control system of claim 17, wherein the bus system is implemented as a serial bus.

* * * * *